(12) United States Patent
Baudendistel et al.

(10) Patent No.: US 6,622,995 B2
(45) Date of Patent: Sep. 23, 2003

(54) HYDRAULIC MOUNT WITH MAGNETORHEOLOGICAL FLUID

(75) Inventors: Thomas A. Baudendistel, Farmersville, OH (US); Sanjiv G. Tewani, Lebanon, OH (US); Jay M. Shores, Miamisburg, OH (US); Mark W. Long, Bellbrook, OH (US); Richard E. Longhouse, Dayton, OH (US); Chandra S. Namuduri, Troy, MI (US); Alexander A. Alexandridis, Orchard Lake Village, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/858,822

(22) Filed: May 16, 2001

(65) Prior Publication Data

US 2002/0171186 A1 Nov. 21, 2002

(51) Int. Cl.⁷ .................................................. F16F 6/00
(52) U.S. Cl. ............................. 267/140.14; 267/140.15
(58) Field of Search ............................. 188/267, 267.2; 267/140.14, 140.15; 248/562, 636

(56) References Cited

U.S. PATENT DOCUMENTS

| | | | |
|---|---|---|---|
| 2,661,596 A | 12/1953 | Winslow | |
| 5,398,917 A | 3/1995 | Carlson et al. | |
| 5,571,263 A | * 11/1996 | Koester et al. | ........ 267/140.13 |
| 6,036,183 A | 3/2000 | Lee et al. | |

* cited by examiner

Primary Examiner—Jack Lavinder
Assistant Examiner—Thomas J. Williams
(74) Attorney, Agent, or Firm—Scott A. McBain

(57) ABSTRACT

A hydraulic mount for automotive engine and powertrain applications includes an elastomer body, a base and a partition interposed the body and the base to form a fluid-pumping chamber and a reservoir. Circumferentially spaced axial extending holes or slots or an annular orifice track are formed in the partition together with a magnetic coil operable to impose a magnetic field on the holes, slots or orifice track to control the shear properties of a magnetorheological (MR) fluid in the pumping chamber and reservoir. An elastomeric decoupler member is in communication with at least one of the pumping chamber and the reservoir to reduce the mount dynamic stiffness for isolating low-displacement relatively high-frequency vibrations. Vibrations of multiple frequencies may be isolated by tuning the mount with a controller.

16 Claims, 3 Drawing Sheets

HYDRAULIC MOUNT WITH MAGNETORHEOLOGICAL FLUID

FIELD OF THE INVENTION

The present invention pertains to a hydraulic mount, particularly adapted for motor vehicle engine and powertrain mount applications, including a magnetorheological (MR) fluid which is forced to flow through an annular path between mount fluid chambers and under the influence of a controllable magnetic field.

BACKGROUND

Conventional automotive vehicle powertrain mounts exist in many variations and generally operate to provide engine vibration isolation while also controlling the motion of the engine and connected powertrain components with respect to the vehicle frame or body structure. In many applications of engine and powertrain mounts, it is desirable to vary the damping characteristics of the mount to provide selective isolation of vibrations at certain frequencies, such as those vibrations related to engine speed, for example. At the same time, it is necessary to provide the mount with a relatively high dynamic stiffness to control large displacements of the powertrain with respect to the vehicle body structure.

However, space limitations in many applications of hydraulic mounts are such as to require that the mount incorporate mechanism which will isolate relatively low-displacement and high-frequency vibrations and which will also damp the aforementioned large displacement movements of the engine and/or related powertrain components with respect to the vehicle body. In this regard, hydraulic engine mounts have been developed with annular fluid flow paths between a pumping chamber and a reservoir, which flow paths may include a somewhat circular or annular orifice track. Such mounts are also desirably provided with a flexible elastomer decoupler member operable to cause the mount to isolate relatively low-displacement, high frequency vibrations associated with unbalanced engine inertia or shaking forces, for example.

Although magnetorheological (MR) fluid-based vibration dampers have been developed, there has been a continuing need to improve the performance of such dampers and to provide an MR-based fluid damper or mount which is adapted to isolate or damp vibrations at multiple frequencies to optimize the ride characteristics or comfort of occupants of motor vehicles, as well as the handling characteristics of the vehicle. It is desirable to provide these features in a mount which does not require relatively large space in the vehicle and may be substituted for conventional mounts without making other design changes in the vehicle. Moreover, it has also been considered desirable to utilize the vehicle engine as a tuned mass damper for the vehicle body structure. It is to these ends that the present invention has been developed.

SUMMARY OF THE INVENTION

The present invention provides an improved hydraulic mount, particularly adapted for automotive vehicle powertrain applications, which utilizes a magnetorheological (MR) fluid to control the damping or vibration isolation characteristics of the mount.

In accordance with one important aspect of the invention, a hydraulic mount is provided which includes an elastomer body, a base member, a partition interposed the elastomer body and the base member and separating a pumping chamber and a reservoir for an MR fluid. The partition defines flow passages for transferring the MR fluid between the pumping chamber and the reservoir and the partition also supports an electric coil for producing a magnetic field to act on the MR fluid which, in turn, varies the vibration isolation and damping characteristics of the mount in a selective manner. The partition also preferably supports an elastomer decoupler member operable to be in communication with at least one of the pumping chamber and the reservoir to aid in isolating relatively low-displacement, high-frequency vibrations imposed on the mount.

The hydraulic mount of the present invention incorporates the above-mentioned features in a relatively compact structure which does not require additional space or alter the dimensional relationships of engine and powertrain mounts and the structure supporting and supported by the mounts in many automotive vehicle applications, for example.

In accordance with another aspect of the present invention, a hydraulic mount is provided which is operable to damp or isolate vibrations of multiple frequencies to provide optimum vibration isolation which is desirable in automotive vehicles wherein powertrain mounts are exposed to vibrations of many frequencies and amplitudes.

In accordance with a still further aspect of the present invention, a compact hydraulic mount is provided which includes a decoupler, a restricted flow path for an MR fluid between a pumping chamber and a reservoir and an electromagnetic coil mounted in such a way as to alter the shear stress needed to move the MR fluid in a selective manner so as to modify the vibration damping characteristics of the mount. The electromagnetic coil is operable to provide a magnetic field of sufficient strength to change the shear stress required to move an MR fluid at a relatively low voltage imposed on the coil, such as the voltage of a conventional automobile electrical system, thereby providing desirable performance characteristics for automotive vehicle applications.

Those skilled in the art will further appreciate the advantages and superior features of the invention upon reading the detailed description which follows in conjunction with the drawings.

DETAILED DESCRIPTION OF THE PREFERRED EMBODIMENTS

Figure 1:
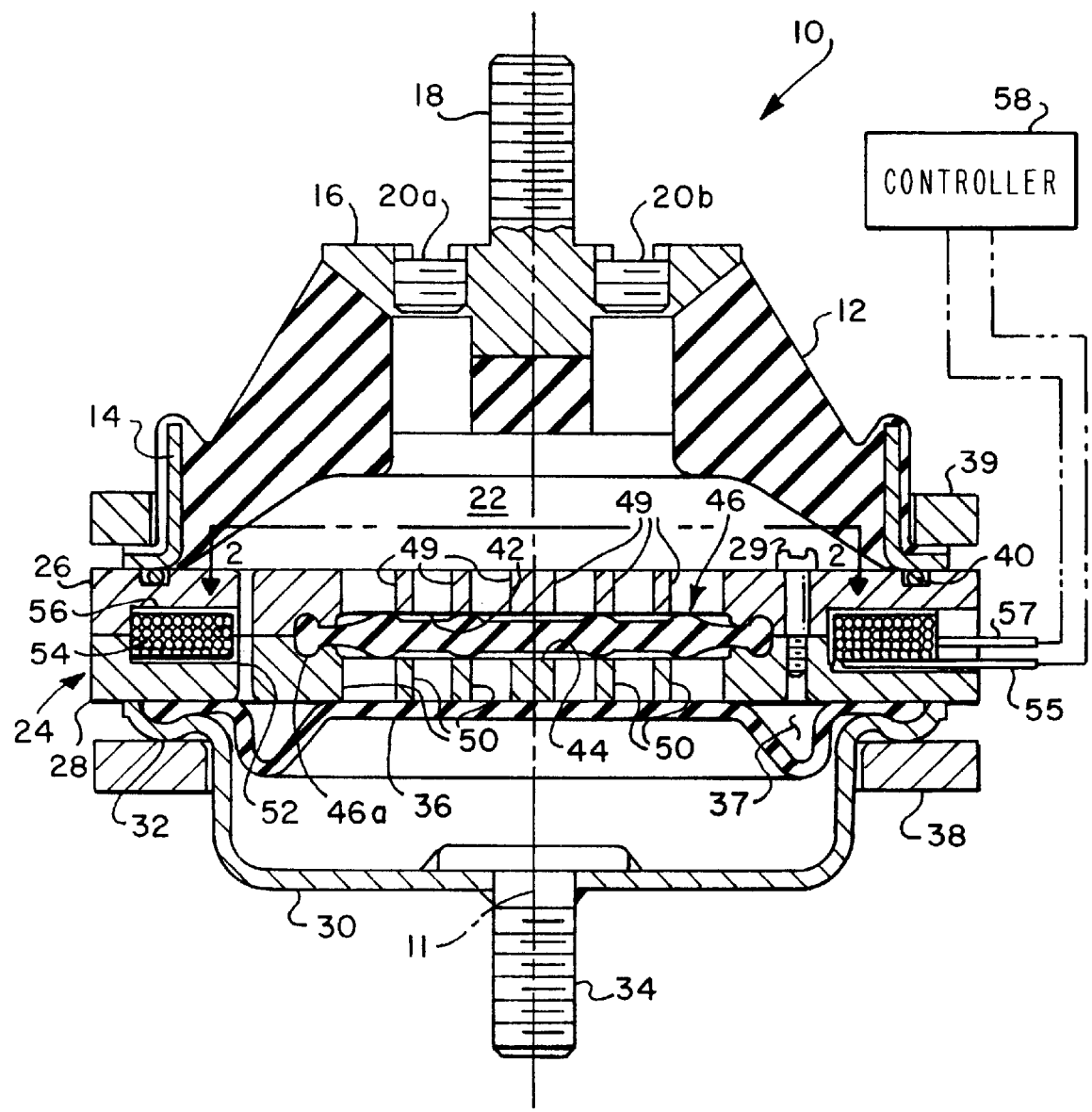
FIG. 1 is a longitudinal central section view of one preferred embodiment of a hydraulic mount in accordance with the invention and taken generally from the line 1—1 of FIG. 2.

In the description which follows, like parts are marked throughout the specification and drawings with the same reference numerals, respectively. The drawing figures are not necessarily to scale and certain features may be shown in schematic or somewhat generalized form in the interest of clarity and conciseness.

Figure 2:
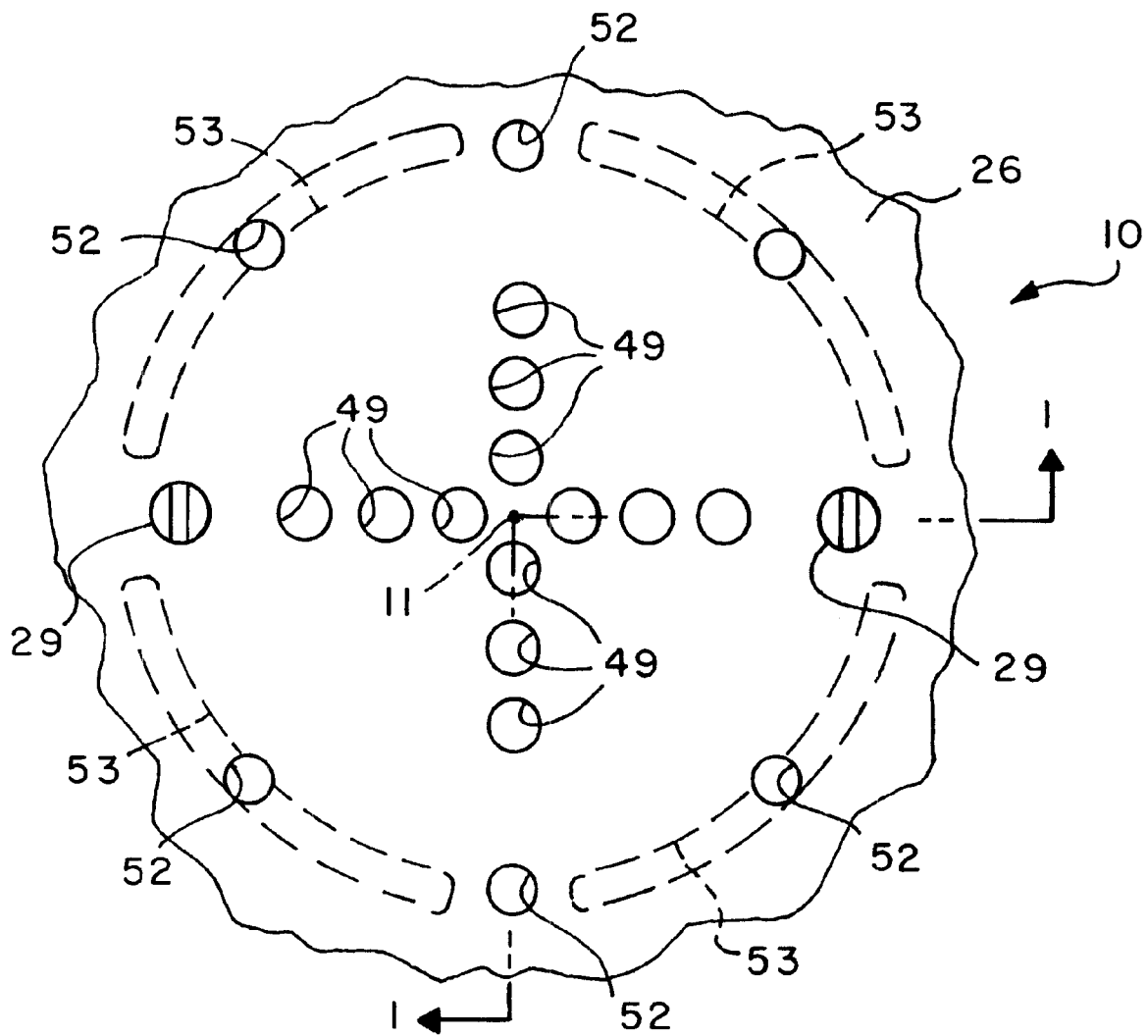
FIG. 2 is a detail plan view taken generally from the line 2—2 of FIG. 1.

Referring to FIGS. 1 and 2, one preferred embodiment of a hydraulic mount in accordance with the invention is illustrated and generally designated by the numeral 10. The hydraulic mount 10 includes a generally frustoconical shaped elastomer body member 12 including an annular, thin metal reinforcing member 14 encapsulated within the elastomer of the body member 12. The body member 12 is also molded to a generally cylindrical support member 16 for an upstanding threaded post type mounting member 18. Support member 16 includes removable fluid fill and vent plugs 20a and 20b for filling an internal pumping chamber 22 with a suitable magnetorheological (MR) hydraulic fluid.

The hydraulic mount 10 further includes a partition member 24 comprising an orifice plate assembly including an upper orifice plate 26 and a lower orifice plate 28 which may be suitably secured in assembly with each other by plural threaded fasteners 29, two shown in FIG. 2. Still further, the hydraulic mount 10 includes a somewhat cylindrical cup-shaped formed metal base member 30 including a circumferential radially outwardly projecting flange 32 engageable with the lower orifice plate 28. A second threaded post mounting member 34 is suitably secured to the base member 30 and is coaxially aligned with the mounting member 18. A flexible elastomer diaphragm 36 is disposed between the base member 30 and the partition 24 and is suitably clamped to the orifice plate 28 by the flange 32. Diaphragm 36 defines a fluid reservoir 37 together with the partition 24. The base member 30 is preferably held in assembly with the body member 12 and the partition 24 by a suitable annular clamp assembly including opposed clamp rings 38 and 39, as shown in FIG. 1. An o-ring seal 40 is supported on the upper orifice plate 26 to form a fluid-tight seal with the body 12.

As shown in FIG. 1, the orifice plates 26 and 28 include opposed generally circular, shallow recesses delimited by walls 42 and 44 between which a cylindrical elastomer disk-shaped decoupler member 46 is disposed. Decoupler member 46 includes a peripheral circular rim 46a which is suitably clamped between the orifice plates 26 and 28 to form a fluid-tight seal to prevent MR hydraulic fluid in the pumping chamber 22 and the reservoir 37 from flowing therebetween around the periphery of the decoupler member. However, the decoupler member 46 is exposed to fluid in the pumping chamber 22 by way of an array of orifices or ports 49 formed in orifice plate 26, see FIG. 2 also. The decoupler member 46 is also exposed to the MR fluid in the reservoir 37 through a similar array of orifices or ports 50, FIG. 1, formed in the lower orifice plate 28. The pattern, number and size of the ports 49 and 50 may be varied and an exemplary arrangement is shown in FIGS. 1 and 2.

The orifice plates 26 and 28 cooperate to provide spaced apart, axially extending, fluid transfer passages 52, as shown in FIGS. 1 and 2, which are shown in the drawing figures as circumferentially spaced cylindrical holes for communicating MR hydraulic fluid between the pumping chamber 22 and the reservoir 37. The number of working passages 52 may be modified by inserting fasteners 29 selectively therein. Alternatively, the passages communicating fluid between the pumping chamber 22 and the reservoir 37 may comprise plural circumferentially spaced annular segment slots 53, as shown in FIG. 2. In all events, a generally annular axially extending passage arrangement is provided for communicating the MR hydraulic fluid directly between the chamber 22 and the reservoir 37.

Referring again to FIG. 1, a suitable electromagnetic winding or coil 54 is interposed the orifice plates 26 and 28 and clamped therebetween. The coil 54 is disposed radially outwardly of passages 52 or 53 with respect to mount central axis 11. Coil 54 is also preferably disposed in a sleeve 56 of nonmagnetic material, such as plastic or stainless steel, and operable to isolate the coil from fluid leakage thereinto and between the plates 26 and 28. The coil 54 includes suitable electrical conductor leads 55 and 57 which extend to a suitable controller and source of electrical power, generally designated by the numeral 58. The controller 58 may receive input signals from suitable vibration and engine speed sensors, for example, not shown, and the controller may include a microprocessor suitably programmed to energize the coil 54 at a selected range of energy input thereto to generate a suitable magnetic field of predetermined intensity passing generally transversely through the passages 52 or 53. In this regard, the orifice plates 26 and 28 may be formed of a suitable magnetic material so that the coil generated magnetic flux lines pass through the passages 52 or 53 in a direction generally normal to the axial extent of the passages, which extent is generally parallel to the central axis 11 of the mount 10.

The composition of a suitable MR fluid usable with the mount 10 and filling the pumping chamber 22 and the reservoir 37 may be, for example, about 100 parts by weight of iron powder, particle size preferably under 5 microns, in a solution of 10 parts by weight of an oily dielectric vehicle, such as white oil, transformer oil or suitable diesters. The MR fluid composition may further include two parts by weight of ferrous oliate or ferrous napthanate as dispersent and one part by weight of an alkaline soap, such as lithium stearate or sodium stearate diluted as desired by additional quantities of vehicle to provide a fluid of which the suspended particles are a permanent component. The composition of the MR fluid may be one of which is described in U.S. Pat. No. 2,661,596 to Winslow or U.S. Pat. No. 5,398,917 to Carlson, et al.

Accordingly, with an MR hydraulic fluid of the type described above filling the fluid chambers 22 and 37, and the passages 52 or 53, of the mount 10, the flow of fluid between the pumping chamber 22 and the reservoir 37 may be controlled by the strength of a magnetic field imposed on the passages 52 or 53, since such magnetic field will increase the shear stress required to move the MR fluid in accordance with the strength of the field. In this way, the dynamic stiffness of the mount 10 may be effectively controlled, as desired. Moreover, by providing an arrangement of a partition characterized by opposed orifice plates, as shown and described in conjunction with FIGS. 1 and 2, and by also providing the mount 10 with the decoupler member 46, the performance characteristics of the mount may be further enhanced.

In particular, low-displacement, relatively high-frequency vibrations may be suitably isolated by the mount 10, thanks to the provision of the decoupler member 46 which is disposed between the plates 26 and 28 and is allowed some axial displacement along the axis 11 in response to fluid forces acting thereon as a consequence of vibrations input to the mount 10 at various frequencies.

Accordingly, the construction of the mount 10 is such that the mount may be substituted for conventional hydraulic mounts, since the additional structure of the mount comprising the electromagnetic coil 54 and the arrangement of the fluid transfer passages 52 and 53 does not result in a substantial increase in the physical size of the mount. Still further, the ability of the mount 10 to damp or isolate vibrations at several different frequencies is enhanced by the provision of the electromagnetic coil 54 and an MR fluid of a type described hereinabove so that the dynamic stiffness of the mount may be varied over a wide range.

Figure 3:
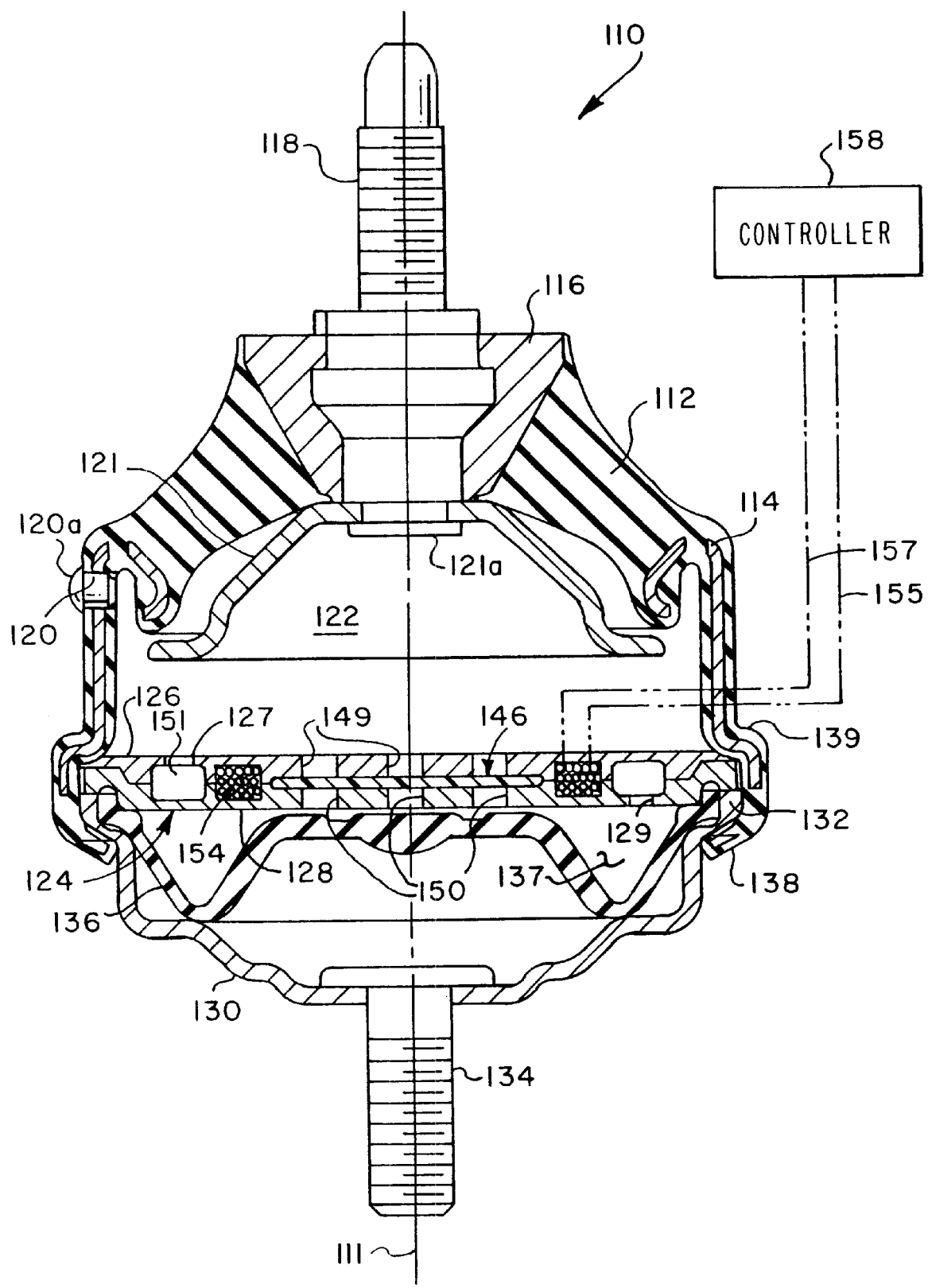
FIG. 3 is a longitudinal central section view of an alternate embodiment of a hydraulic mount in accordance with the invention.

Referring now to FIG. 3, an alternate embodiment of a hydraulic mount in accordance with the invention is illustrated and generally designated by the numeral 110. The mount 110 is also characterized by a generally cylindrical and somewhat frustoconical-shaped elastomer body 112 reinforced by a segmented, annular, metal plate elastically deformable reinforcing member 114 encapsulated within the elastomer material of the body. A mounting element retaining member 116 is molded to the elastomer body 112 and supports an upstanding threaded mounting member 118. A fluid fill port 120 is closed by a rivet-like closure member 120a. A somewhat inverted cup-shaped interlock member 121 is supported on the body 112 by a retainer member 121a.

The mount 110 includes a generally cylindrical planar partition 124 characterized by cylindrical disk-shaped orifice plates 126 and 128 between which is secured a cylindrical elastomer disk-shaped decoupler member 146. The decoupler member 146 is retained between orifice plates 126 and 128 and is in communication with a fluid-pumping chamber 122 and also with a reservoir 137 by way of respective arrays of ports 149 and 150 formed in the orifice plates 126 and 128, respectively. Decoupler member 146 is retained between the orifice plates 126 and 128 for limited movement within a relatively thin cavity formed between the orifice plates, generally in the same manner that the decoupler member 46 is retained between the orifice plates 26 and 28.

The hydraulic mount 110 is further characterized by an annular orifice track 151 formed between the orifice plates 126 and 128 which is in communication with the pumping chamber 122 by way of a port 127 and with the reservoir 137 by way of a port 129. The annular orifice track 151 thus allows fluid to flow through port 127, through the annular passage formed by the orifice track in a circular path about the axis 111 and through the port 129 into the reservoir 137. In response to oscillatory movement of the body member 112, the MR fluid in the pumping chamber 122 and reservoir 137 may flow back and forth through the orifice track 151.

Also disposed between the orifice plates 126 and 128 is an annular electromagnetic winding or coil 154, similar to the coil 54 but disposed radially inwardly of the annular orifice track 151 with respect to mount central axis 111. Coil 154 is in electrical communication with a controller 158, substantially like the controller 58, by way of suitable conductors 155 and 157. A magnetic field created by the coil 154 passes generally transversely through the passage formed by the orifice track 151 when the coil is energized at selected magnetic field intensities by the controller 158. Accordingly, fluid flowing through the passage 151 may be subject to a shear stress change imposed thereon by the aforementioned magnetic field to thereby modify the vibration isolation or damping characteristics of the mount 110 generally in the same manner that the imposition of magnetic fields on the passages 52 or 53 affect the performance of the mount 10.

Accordingly, the mount 110 may be controlled to operate in substantially the same manner as the mount 10 but exhibits a different configuration of the partition between the MR fluid filled pumping chamber 122 and reservoir 137 of the mount and the flow path of fluid between the pumping chamber and reservoir. However, the mount 110 also enjoys the benefits of the elastomeric decoupler 146 which is in communication with at least one of the pumping chamber 122 and reservoir 137 of the mount. The orifice plates 126 and 128 are also preferably formed of a suitable magnetic material. The mount 110 is assembled by clamping the base member 130, the diaphragm 136 and the partition 124 to the body member 112 by forming the circumferential inwardly turned flange 138 of the body member and opposed to a formed circumferential shoulder 139. Assembly of the hydraulic mount 110 may be accomplished in a generally known manner for hydraulic mounts of similar configuration, but which do not include an MR fluid, the coil 154, and the specific configuration of the partition 124 which are provided for the mount 110.

The construction and operation of the mounts 10 and 110 is believed to be within the purview of one of skill in the art based on the foregoing description when read in conjunction with the drawings. Although preferred embodiments of the invention have been described in detail, those skilled in the art will also recognize that various substitutions and modifications may be made to the invention without departing from the scope and spirit of the appended claims.

What is claimed is:

1. A hydraulic mount for supporting a component of an automotive vehicle, said mount comprising:

first and second mounting elements;

an elastomer body member connected to one of said mounting elements and a base member connected to the other of said mounting elements;

a partition interposed said body member and said base member, said partition having first and second passages therethrough;

a flexible diaphragm interposed said partition and said base member;

a fluid-pumping chamber defined at least in part by said body member and said partition;

a reservoir defined at least in part by said diaphragm and said partition;

said first passage communicating a hydraulic fluid between said pumping chamber and said reservoir, said hydraulic fluid being responsive to a magnetic field to modify its shear properties;

an electromagnetic coil supported on said partition and operable to generate a magnetic field intersecting said passage to selectively modify the shear properties of said hydraulic fluid and to control fluid flow between said pumping chamber and said reservoir to modify the damping characteristics of said mount; and a decoupler member extending across and closing said second passage such that said fluid cannot pass through or around the periphery thereof and supported by said partition and in fluid communication with at least one of said pumping chamber and said reservoir, said decoupler member being axially displaceable relative to said partition sufficiently to isolate relatively low-displacement, high-frequency vibration in said fluid.

2. The mount set forth in claim 1 wherein:

said coil is disposed circumferentially around said decoupler member.

3. The mount set forth in claim 2 wherein:

said partition comprises opposed orifice plates supporting said decoupler member therebetween.

4. The mount set forth in claim 3 wherein:

said orifice plates support said coil therebetween.

5. The mount set forth in claim 1 wherein:

said passage comprises a plurality of circumferentially spaced axially extending holes formed in said partition and extending between said pumping chamber and said reservoir.

6. The mount set forth in claim 1 wherein:

said passage comprises at least one annular slot formed in said partition and extending between said pumping chamber and said reservoir.

7. A hydraulic mount for supporting a component of an automotive vehicle, said mount comprising:

first and second mounting elements;

an elastomer body member connected to one of said mounting elements and a base member connected to the other of said mounting elements;

a partition interposed said body member and said base member;

a flexible diaphragm interposed said partition and said base member;

a fluid-pumping chamber defined at least in part by said body member and said partition;

a reservoir defined at least in part by said diaphragm and said partition;

a passage formed in said partition and communicating a hydraulic fluid between said pumping chamber and said reservoir, wherein said passage comprises an annular orifice track formed in said partition and in communication with said pumping chamber by way of a first port and with said reservoir by way of a second port circumferentially spaced from said first port, both of said ports intersecting said orifice track, and wherein said hydraulic fluid is responsive to a magnetic field to modify its shear properties;

an electromagnetic coil supported on said partition and operable to generate a magnetic field intersecting said passage to selectively modify the shear properties of said hydraulic fluid and to control fluid flow between said pumping chamber and said reservoir to modify the damping characteristics of said mount; and a decoupler member supported by said partition and in fluid communication with at least one of said pumping chamber and said reservoir.

8. A hydraulic mount for supporting a component of an automotive vehicle, said mount comprising:

first and second mounting elements;

an elastomer body member connected to one of said mounting elements and a base member connected to the other of said mounting elements;

a partition interposed said body member and said base member, said partition having first and second passages therethrough;

a flexible diaphragm interposed said partition and said base member;

a fluid-pumping chamber defined at least in part by said body member and said partition;

a reservoir defined at least in part by said diaphragm and said partition;

said first passage communicating a hydraulic fluid between said pumping chamber and said reservoir, said hydraulic fluid being responsive to a magnetic field to modify its shear properties;

an electromagnetic coil supported on said partition and operable to generate a magnetic field intersecting said passage to selectively modify the shear properties of said hydraulic fluid and to control fluid flow between said pumping chamber and said reservoir to modify the damping characteristics of said mount;

a decoupler member extending across and closing said second passage such that said fluid cannot pass through or around the periphery thereof and supported by said partition and in fluid communication with at least one of said pumping chamber and said reservoir, said decoupler member being axially displaceable relative to said partition sufficiently to isolate relatively low-displacement, high-frequency vibration in said fluid; and said coil is interposed said passage and said decoupler member.

9. The mount set forth in claim 1 wherein:

said passage is interposed said coil and said decoupler member.

10. The mount set forth in claim 1 including:

a controller operably connected to said coil for varying the intensity of said magnetic field to modify the damping characteristics of said mount.

11. A hydraulic mount for supporting a component of an automotive vehicle, said mount comprising:

an elastomer body member;

a base member;

a partition interposed said body member and said base member, said partition having first and second passages therethrough;

a fluid-pumping chamber between said body member and said partition;

a reservoir between said base member and said partition;

a decoupler member extending across and closing said second passage such that said fluid cannot pass through or around the periphery thereof and supported by said partition and in fluid communication with at least one of said pumping chamber and said reservoir, said decoupler member being axially displaceable relative to said partition sufficiently to isolate relatively low-displacement, high-frequency vibration in said fluid;

annular passage means for said first passage formed in said partition and communicating a hydraulic fluid between said pumping chamber and said reservoir, said hydraulic fluid being responsive to a magnetic field to modify its shear properties; and an electromagnetic coil supported on said partition radially outwardly of said passage means with respect to a central axis of said mount and operable to generate a magnetic field intersecting said passage means to selectively modify the shear properties of said hydraulic fluid and to control fluid flow between said pumping chamber and said reservoir to modify the damping characteristics of said mount.

12. The mount set forth in claim 11 wherein:

said partition comprises opposed orifice plates supporting said decoupler member and said coil therebetween.

13. The mount set forth in claim 11 wherein:

said passage means comprises a plurality of circumferentially spaced axially extending holes formed in said partition and extending between said pumping chamber and said reservoir.

14. The mount set forth in claim 11 wherein:

said passage means comprises at least one annular slot formed in said partition and extending between said pumping chamber and said reservoir.

15. A hydraulic mount for supporting a component of an automotive vehicle, said mount comprising:

first and second mounting elements;

an elastomer body member connected to one of said mounting elements and a base member connected to the other of said mounting elements;

a partition interposed said body member and said base member, said partition having first and second passages therethrough;

a flexible diaphragm interposed said partition and said base member;

a fluid-pumping chamber defined at least in part by said body member and said partition;

a reservoir defined at least in part by said diaphragm and said partition;

said first passage communicating a hydraulic fluid between said pumping chamber and said reservoir, said hydraulic fluid being responsive to a magnetic field to modify its shear properties;

an electromagnetic coil supported on said partition and operable to generate a magnetic field intersecting said passage to selectively modify the shear properties of said hydraulic fluid and to control fluid flow between said pumping chamber and said reservoir to modify the damping characteristics of said mount; and an elastomer decoupler member extending across and closing said second passage such that said fluid cannot pass through or around the periphery thereof and supported by said partition and in fluid communication with at least one of said pumping chamber and said reservoir, said decoupler member being axially displaceable relative to said partition sufficiently to isolate relatively low-displacement, high-frequency vibration in said fluid.

16. A hydraulic mount for supporting a component of an automotive vehicle, said mount comprising:

an elastomer body member;

a base member;

a partition interposed said body member and said base member, said partition having first and second passages therethrough;

a fluid-pumping chamber between said body member and said partition;

a reservoir between said base member and said partition;

an elastomer decoupler member extending across and closing said second passage such that said fluid cannot pass through or around the periphery thereof and supported by said partition and in fluid communication with at least one of said pumping chamber and said reservoir, said decoupler member being axially displaceable relative to said partition sufficiently to isolate relatively low-displacement, high-frequency vibration in said fluid;

annular passage means for said first passage formed in said partition and communicating a hydraulic fluid between said pumping chamber and said reservoir, said hydraulic fluid being responsive to a magnetic field to modify its shear properties; and an electromagnetic coil supported on said partition radially outwardly of said passage means with respect to a central axis of said mount and operable to generate a magnetic field intersecting said passage means to selectively modify the shear properties of said hydraulic fluid and to control fluid flow between said pumping chamber and said reservoir to modify the damping characteristics of said mount.

* * * * *